Dec. 20, 1955   E. GÜNTHARDT   2,728,001
ELECTRICAL GENERATOR WITH COOLED ROTOR WINDINGS
Filed July 20, 1953
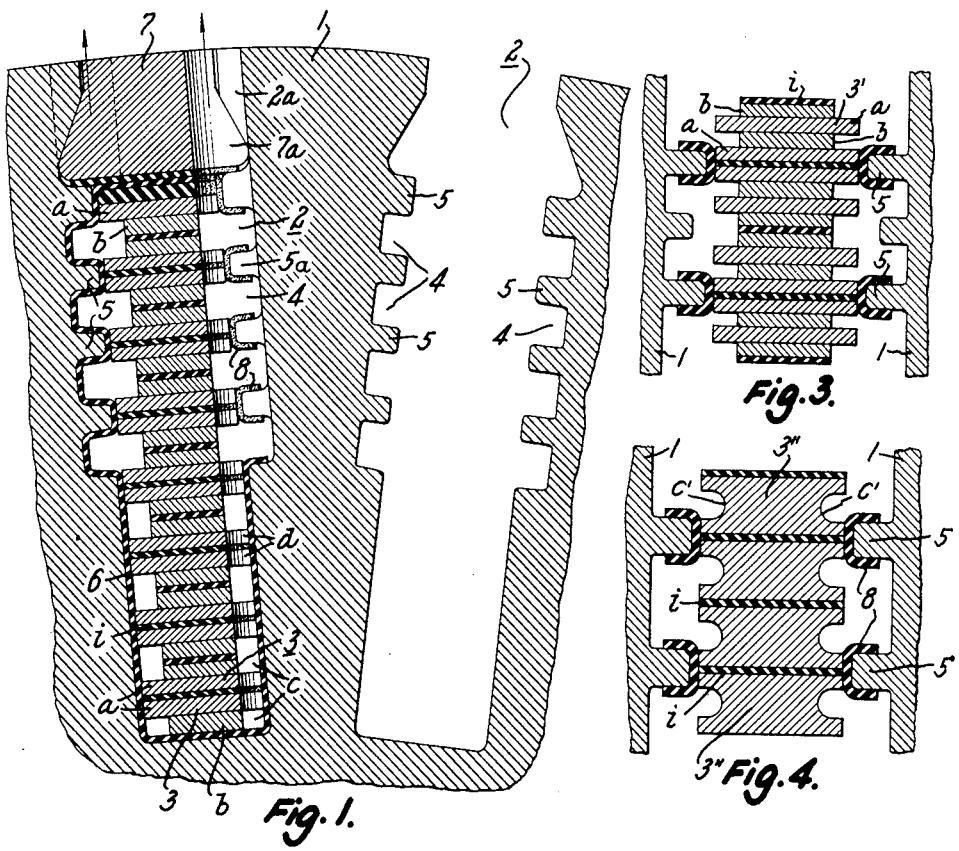
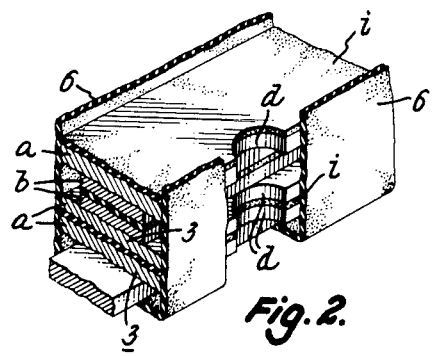
INVENTOR:-
Emil Günthardt,
BY Pierce, Scheffler + Parker,
ATTORNEYS.

United States Patent Office 2,728,001
Patented Dec. 20, 1955

2,728,001

ELECTRICAL GENERATOR WITH COOLED ROTOR WINDINGS

Emil Günthardt, Baden, Switzerland, assignor to Aktiengesellschaft Brown, Boveri & Cie, Baden, Switzerland, a joint-stock company Application July 20, 1953, Serial No. 369,146

4 Claims. (Cl. 310—61)

This invention relates to an electrical generator in which the windings of the generator rotor are cooled by air or a gas.

The capacity of a turbogenerator is essentially determined by the permissible heating of the winding. The more effective the cooling of this winding, the greater is the attainable capacity with given rotor dimension.

In the cooling, two types can be differentiated between in principle:

(1) The cooling by the cooling gas is done on the rotor surface and by axial cooling channels additionally provided in the rotor body.

(2) The cooling gas contacts directly with the copper of the rotor winding.

The first type of cooling is at a disadvantage as compared to the second one in as far as the amount of heat to be conducted away must first be conducted through the winding insulation, which requires a correspondingly large temperature gradient, so that the winding copper is warmer than the adjacent rotor teeth. But the temperature differences between winding and rotor iron result in differential expansions which cause an undesired and possibly destructive "working" of the winding.

In the second type of direct cooling, the heat emission from copper mainly goes directly to the gas, not first over the insulation and the rotor iron but, of course, here too a certain temperature difference will occur between winding and rotor teeth.

Many constructions according to the second type of cooling are open to the objection that individual conductors are not satisfactorily retained mechanically in the rotor slots whereby dislocations of the conductors may lead to short circuits in the winding.

Objects of the invention are to provide an electrical generator rotor having windings in radial slots thereof, the windings being firmly secured in the rotor slots and directly contacted by the cooling medium. An object is to provide a cooled generator rotor in which the windings are of such cross-section as to form axially extending cooling passages within the rotor slots.

These and other objects and the advantages of the invention will be apparent from the following specification when taken with the accompanying drawing, in which:

Fig. 1 is a fragmentary transverse cross-section through a rotor, and showing a winding embodying the invention in one rotor slot;

Fig. 2 is a fragmentary perspective view of a portion of a winding as shown in Fig. 1;

Figs. 3 and 4 are fragmentary transverse sections through a rotor and showing other conductor profiles.

In the drawing, the reference numeral 1 identifies a generator rotor having axially extending radial slots 2 in which the windings are located. As shown in Fig. 1, there are fifteen conductors 3 to a slot, each conductor being of broad T-shape and comprising a wide copper strap or bar $a$ and a narrow copper strap or bar $b$ which are connected to each other by soldering or brazing. Adjacent conductors 3 are reversed as to profile and are separated from each other by strips of insulation $i$. The T-profile of the conductors provides axial channels $c$ for the cooling gas or air.

The axial channels may be enlarged, as shown in the outer portions of the rotor slots, by recesses 4 between sets of laterally alined and axially extending bare ribs 5 of the rotor body, the recesses 4 alining radially with the channels $c$.

The walls of the rotor slots are lined with sheet insulation 6, and the wide bars $a$ of the winding are of such width as to fit snugly against the insulation, thereby holding the winding firmly in place when the wedge strip 7 is forced into the undercut outer end of the rotor slot.

The insulation at the rotor ribs 5 may be limited to channel strip 8 having webs seated between the wide portions $a$ of the conductors 3 and the faces of the ribs 5 and flanges which are only so long as required for voltage leakage insulation, whereby a large part of the bare rotor rib surfaces comes into direct contact with the cooling gas.

The conductor bars $a$ and their insulating channel strips 8 are provided at intervals with notches $d$ which aline radially to form passages which connect the individual lengthwise cooling channels $c$ with each other. The ribs 5 of the rotor body are cut back at 5$a$, in line with the notches $d$ of the conductors, and the mouth of the slot 2 and the wedge strip 7 have mating semicylindrical grooves 2$a$, 7$a$, respectively, to complete radial passages through which the cooling gas is discharged by centrifugal force.

Conductors of other profiles may be employed to provide cooling channels having a large surface area. As shown in Fig. 3, the conductors 3' may be of double T-shape in cross-section and made up of two wide copper bars $a$ and two narrow copper bars $b$. Alternatively, the conductors 3" may be single heavy bars with grooves $c'$ at each side which provide a blunt H-shape in transverse cross-section, see Fig. 4.

The cooling gas or air enters the channels $c$ at one or both ends of the rotor 1 and flows along the copper bars until it is discharged at one of the radial passages. The gas is heated by the copper conductors and then gives off a part of the heat to the rotor body, thereby resulting in a minimum temperature difference between the copper winding and the rotor iron.

I claim:

1. A generator rotor comprising a body having axially extending radial slots from the opposite sides of which laterally alined and longitudinally extending sets of bare ribs of said body project, windings in said slots, means insulating the wide sections of said windings from the opposed faces of each of said sets of laterally alined ribs; said windings comprising individual conductors of bare bar type positioned between a set of laterally alined ribs and each including a wide section and a narrower section providing an axially extending channel constituting means for the flow of a cooling gas along the sides of said slot between said ribs.

2. A generator rotor as recited in claim 1, and wherein the wide sections of the conductors snugly engage the insulation means to prevent movement of the conductors within the slots.

3. A generator rotor as recited in claim 1, wherein said insulating means consists of channel strips of insulating material fitted over and extending along said ribs, the webs of said channel strips being positioned between the wide sections of the conductors and the opposed faces of laterally alined sets of ribs and the flanges of said strips terminating short of the roots of said ribs, whereby the faces of the slot sides between adjacent ribs are bare and in direct contact with the cooling gas.

4. A generator stator as recited in claim 3, wherein the mouth of the slot is undercut and a plurality of individual bare conductors are superposed in the slot, in combination with strips of insulation interleaved between adjacent conductors, and a wedge strip seated in the undercut portion of the slot to secure the conductors in the slot, and wherein the wide sections of the conductors and the interleaved insulating strips are notched in radial alinement to provide communication between adjacent axially extending cooling channels, said wedge strips and said rotor ribs being provided with recesses mating with the notches of said conductor and insulating strips to complete radial passages for the discharge of the cooling gas from said channels by centrifugal force.

References Cited in the file of this patent

UNITED STATES PATENTS

| | | |
|---|---|---|
| 2,094,358 | Kilgore | Sept. 28, 1937 |
| 2,663,808 | Rosenberg | Dec. 22, 1953 |

FOREIGN PATENTS

| | | |
|---|---|---|
| 96,244 | Switzerland | Sept. 16, 1922 |
| 295,610 | Germany | Dec. 11, 1916 |
| 714,319 | France | Sept. 1, 1931 |
| 778,916 | France | Jan. 2, 1935 |